George Reiber.
Heart Hay Knife.
No. 118,390.
Patented Aug. 22, 1871.
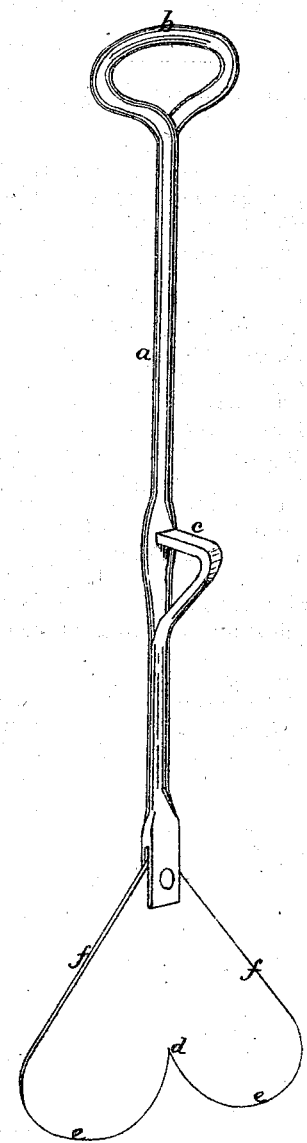
Witnesses:
Eugene C. Adams,
J. West Wagner.
George Reiber, Inventor:
by Johnson, Klaucke & Co.
his Attorneys

UNITED STATES PATENT OFFICE.

GEORGE REIBER, OF DOVER, PENNSYLVANIA, ASSIGNOR TO HIMSELF, LEWIS RAFFENSPERGER, AND SAMUEL REIBER, OF SAME PLACE.

IMPROVEMENT IN HAY-KNIVES.

Specification forming part of Letters Patent No. 118,390, dated August 22, 1871.

*To all whom it may concern:*

Be it known that I, GEORGE REIBER, of Dover, in the county of York and State of Pennsylvania, have invented a new and useful Improvement which I denominate the Heart Hay-Knife, of which the following is a specification:

My invention relates to knives for cutting hay in the stack; and it consists in forming the knife in the shape of a heart, having convex cutting-edges and receding sides, whereby it is made to enter and penetrate the stack without either pressing the hay away from the cutting-edge or compressing it between the edges, and thus requires very little pressure to force it through the body of the hay, and at the same time prevents all tendency to spread or force the hay out while cutting the stack in twain.

The accompanying drawing represents a view, in perspective, of a hay-knife embracing my invention, in which—

$a$ is the shank or handle of the knife, having a hand-hold, $b$, at its upper end, and a projecting foot-rest, $c$, by which the knife is held and pressed into the hay. The blade of the knife is heart-shaped—that is to say, its cutting-edge is made convex. Starting from a point, $d$, in the middle of its width and curving downward on either side, is forms a convex cutting-edge, $e$, terminating upward at the outer edges $f$ of the blade, from which it will be seen that in passing through the hay it will neither compress it between the cutting-edges nor force it from them, but will cut through the body with little or no resistance. Moreover, the receding sides $f$ greatly facilitate its withdrawal from the body of the hay without hanging or catching therein. It is also easily ground and kept sharp, and presents a continuous convex cutting-edge, starting from a central point and forming two convex cutting-wings with receding sides.

Having thus described my invention, I claim—

A heart-shaped hay-knife, having convex cutting-wings $e$ and receding sides $f$, as described.

GEORGE REIBER.

Witnesses:
LEWIS STRAYER,
GEO. G. HYDE.